Sept. 22, 1953 W. A. DERR 2,653,188

REMOTE-CONTROL SYSTEM

Filed Feb. 1, 1951 4 Sheets-Sheet 1

Fig.I.

WITNESSES:
Robert C. Baird
F. V. Giolma

INVENTOR
Willard A. Derr.
BY
[signature]
ATTORNEY

Sept. 22, 1953 W. A. DERR 2,653,188

REMOTE-CONTROL SYSTEM

Filed Feb. 1, 1951 4 Sheets-Sheet 2

WITNESSES:

E. A. McCloskey

F. V. Giolma

INVENTOR

Willard A. Derr.

BY

[signature]

ATTORNEY

Sept. 22, 1953 W. A. DERR 2,653,188

REMOTE-CONTROL SYSTEM

Filed Feb. 1, 1951 4 Sheets-Sheet 3

WITNESSES:

Robert C. Baird

F. V. Giolma

INVENTOR

Willard A. Derr.

BY

ATTORNEY

INVENTOR
Willard A. Derr.
BY [signature]
ATTORNEY

Patented Sept. 22, 1953 2,653,188

UNITED STATES PATENT OFFICE 2,653,188

REMOTE-CONTROL SYSTEM

Willard A. Derr, Pittsburgh, Pa., assignor to Westinghouse Electric Corporation, East Pittsburgh, Pa., a corporation of Pennsylvania Application February 1, 1951, Serial No. 208,925

7 Claims. (Cl. 179—2.5)

My invention relates generally to remote control systems, and it has reference in particular to a carrier frequency supervisory contol system for operating on a channel having a communication or telemetering circuit associated therewith.

Generally stated, it is an object of my invention to provide in a simple and inexpensive manner for furnishing a continuous carrier frequency channel for the transmission of communications over the same two-frequency channel on which supervisory control equipment operates.

More specifically, it is an object of my invention to provide for operating supervisory control equipment over the same two-frequency carrier frequency channel that provides a communication circuit between two stations, and provide preferential operation for the supervisory control equipment.

Another object of my invention is to provide in a two-frequency supervisory control system having a communication circuit operating on the same frequencies for granting preference to supervisory control operations under all operating conditions.

Yet another object of my invention is to provide in a supervisory control system operating over a two-frequency channel, for utilizing coded signal impulses for transferring the channel from communication apparatus or the like to the supervisory control equipment before any selections of control points are made.

It is also an object of my invention to provide in a two-frequency supervisory control system for operating the usual line relays from the carrier frequency receivers in response to coded signals of unmodulated carier frequency, and for so controlling the operation of the carrier frequency transmitters as to enable supervisory control operations to take precedence over communication operations under different operating conditions.

Other objects will in part be obvious, and will in part be explained hereinafter.

In practicing my invention in accordance with one of its embodiments, supervisory control operations are effected over a two-frequency, carrier frequency communication channel which connects telephone equipments at two remote stations. Provision is made for the supervisory equipment to disconnect the telephone equipment from the carrier frequency equipment at the station from which a supervisory operation originates, upon initiation of the operation, so as to remove the carrier signal of that station from the channel. The supervisory line relay is disconnected from a station battery at the initiating station, until the telephone equipment at the other station can be disconnected from the carrier frequency equipment at said other station to deenergize the carrier transmitter at said other station, in response to the receipt of coded carrier frequency impulses from the originating station. The station battery at the originating station is reconnected to the line relay upon termination of the usual selection code, so as to prepare the supervisory equipment at the originating station for receiving the usual check code from the other station.

For a more complete understanding of the nature and scope of my invention, reference may be made to the following detailed description, which may be read in connection with the accompanying drawings in which.

Figure 1:
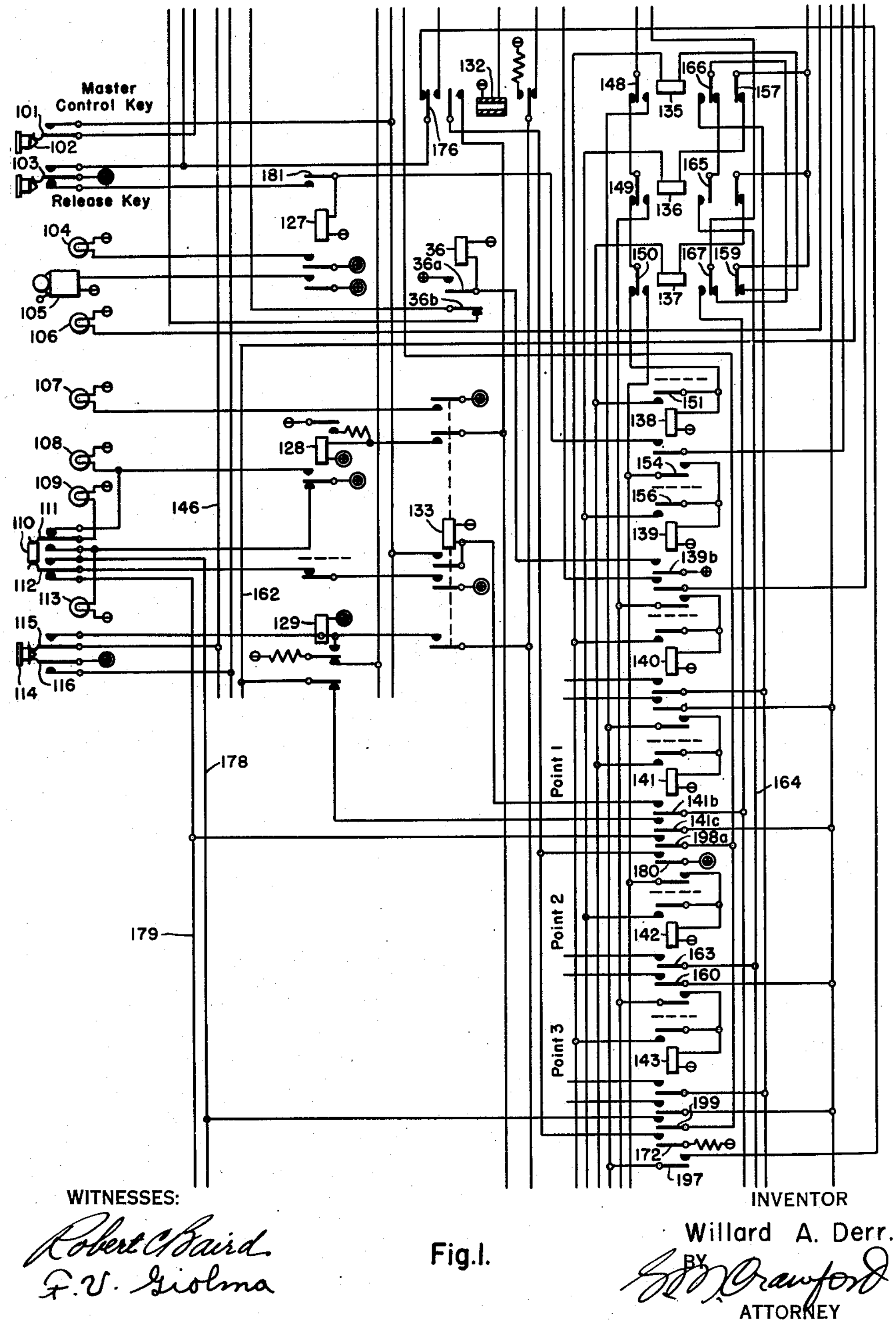
Figure 1 is a diagrammatic view of the individual equipment and point selecting relays at the dispatching office, in a supervisory control system embodying the invention.

The above-described figures are disposed to be arranged in a similar manner to Figs. 1 through 4 of the Boswau Patent No. 2,091,301, which issued on August 31, 1937. When thus arranged, they represent the combination of a two-frequency communication system with a supervisory control system which is basically the same as the supervisory control system described in detail in the Boswau patent. For the purpose of simplification, some of the circuit conductors have been rearranged from the positions shown in the Boswau patent, but the general arrangement of the supervisory control equipment and the manner of operation thereof remain substantially the same. Most of the elements of the system of the Boswau patent are shown in the drawings of the present application, in substantially the same cooperative relation as in the Boswau patent, and they bear the same reference characters as in the drawings of the Boswau patent. Certain relays of the Boswau patent have been modified slightly to accommodate additional circuit connections, and other relays have been added in order to perform functions different from those of the apparatus in the Boswau patent. New elements have been designated by reference characters not appearing in the Boswau patent, while other elements which have been changed slightly have been designated by means of prime numbers corresponding to the designation in the Boswau patent in order to more readily identify them.

Figure 2:
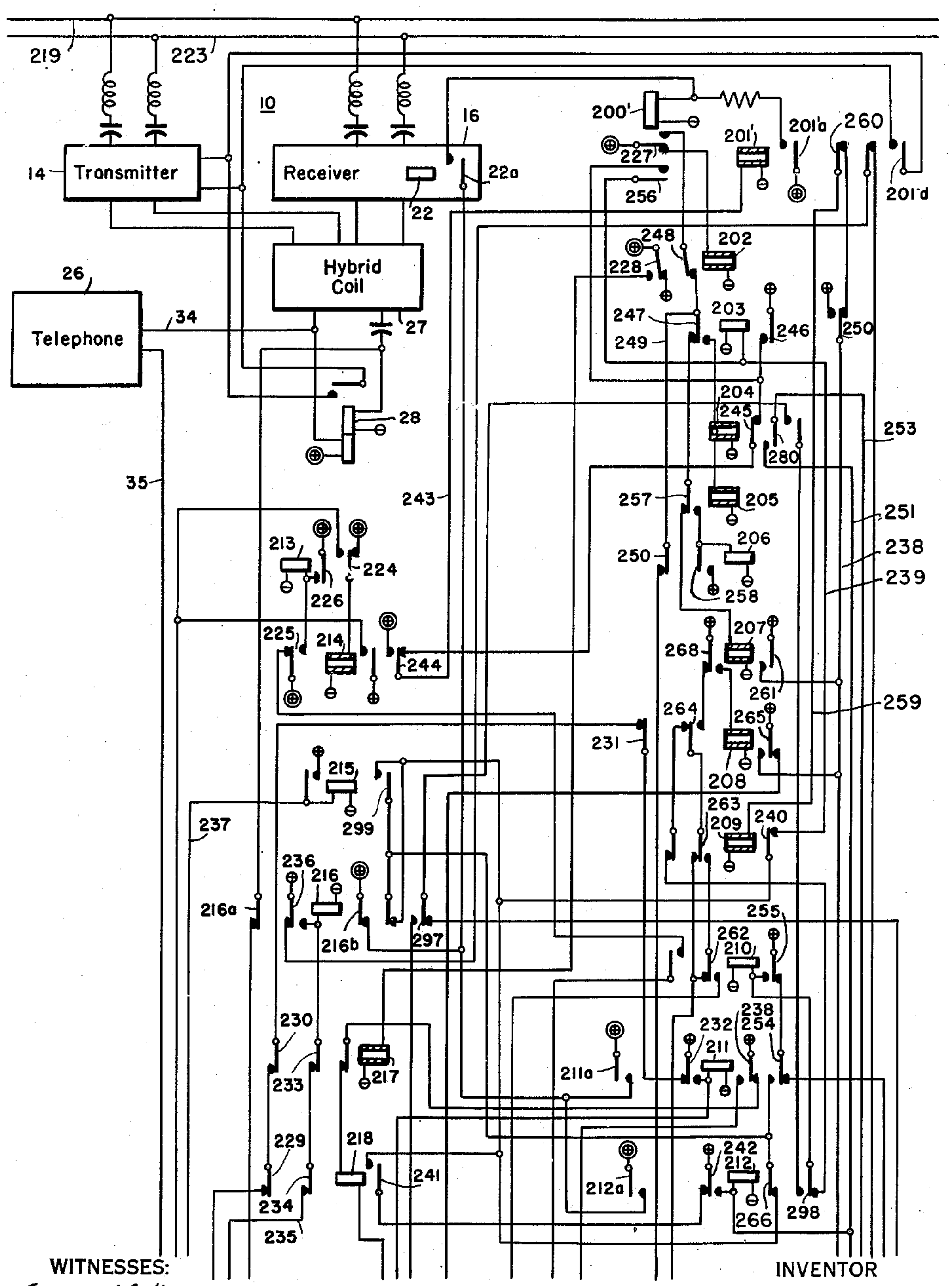
Fig. 2 is a diagrammatic view of the common supervisory control equipment, the carrier frequency equipment, and the telephone equipment, at the dispatching office.
Figure 3:
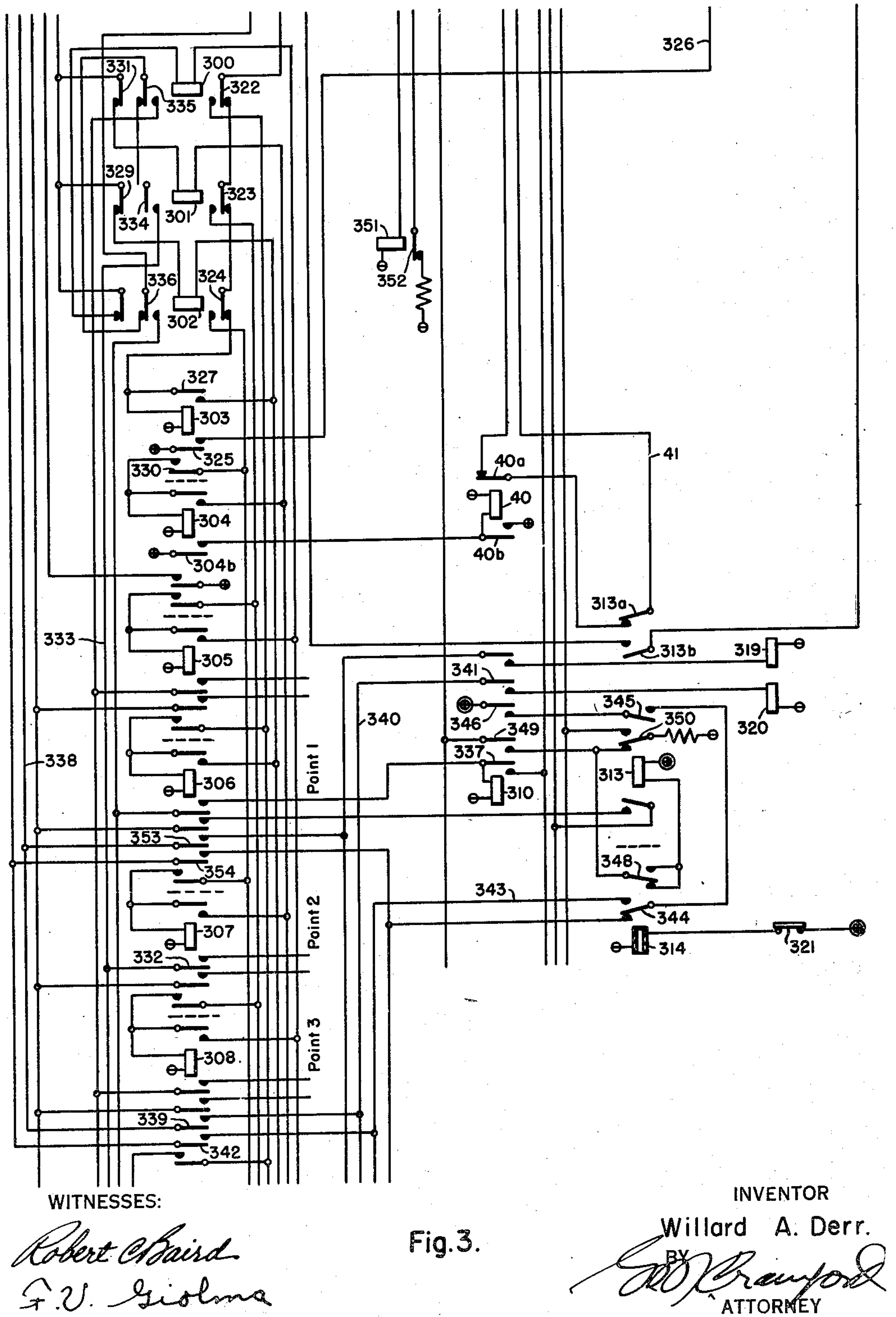
Fig. 3 is a diagrammatic view of the individual equipment and point selecting relays at the remote sub-station associated with the dispatching office of Figs. 1 and 2.
Figure 4:
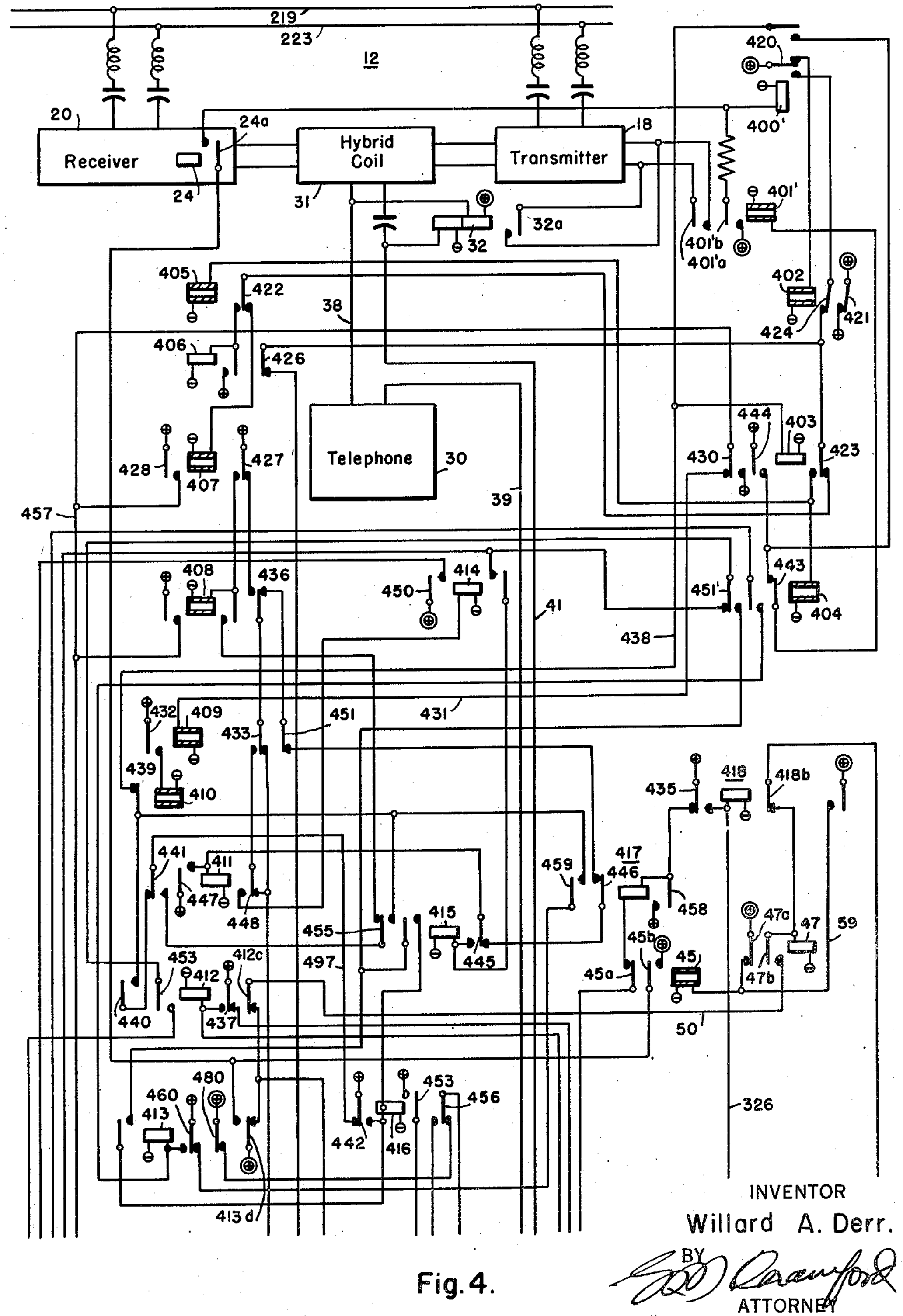
Fig. 4 is a diagrammatic view of the common supervisory equipment, the carrier frequency equipment, and the telephone equipment at the remote substation.

Referring particularly to Figs. 2 and 4 of the drawings, it will be seen that the line circuit for providing connections between the supervisory control equipments at the dispatching office and substation has been changed from the series impulsing circuit of the Boswau patent, to provide instead a carrier frequency channel which in this instance extends over the same line conductors 219 and 223. Instead of the supervisory control line relays being connected as shown in the Boswau patent, carrier frequency equipments 10 and 12 have been provided at the dispatching office and remote substation, respectively. They may, for example, comprise a carrier frequency transmitter 14 operating on a carrier frequency F2 and a carrier frequency receiver 16 operating on a frequency F1 which may be connected to the channel conductors 219 and 223 at the dispatching office by means of suitable tuned coupling circuits, and a carrier frequency transmitter 18 operating on a frequency F1 and a carrier frequency receiver 20 operating on a frequency F2, which may be connected to the channel conductors 219 and 223 at the substation by means of suitable coupling circuits. The line relay 200′ at the dispatching office may be connected to the station battery by means of a receiver relay 22 in the receiver 16. The impulse relay 201′ instead of completing a series circuit for the line relays, may be arranged to key the transmitter 14 through armature 201′*d* for transmitting coded signals of carrier frequency F2 in response to operation of the supervisory control equipment. The line relay 400′ at the substation may likewise be energized in response to operation of a receiver relay 24 of the receiver 20, while the transmitter 18 may be keyed through armature 401′*a* for producing coded carrier frequency signals of the frequency F1.

Telephone equipment designated by the enclosure 26 at the dispatching office may be connected for operation through the carrier frequency equipment 10 through the usual hybrid coil 27 in a manner well known in the art. Means such as the telephone relay 28 may be provided for keying the transmitter 14 in response to the completion of a circuit through the telephone equipment 26 when the receiver thereof is lifted from the usual hook switch thereof for placing the carrier frequency F2 upon the channel for communication purposes.

At the remote substation, telephone equipment 30 may likewise be connected to the carrier frequency equipment 12 through a hybrid coil 31 for transmitting telephone communications. A telephone relay 32 may be provided for keying the transmitter 18 in response to completion of a circuit through the telephone equipment 30 when the receiver thereof is lifted from the hook switch.

In order to provide for granting preference to the supervisory control equipment over the telephone equipment, provision may be made at both the dispatching office and the substation for disconnecting the telephone equipment from the carrier frequency equipment whenever a supervisory control operation is initiated.

At the dispatching office the telephone equipment 26 may be connected to the carrier frequency equipment 10 by means of conductor 34, and a circuit which extends through conductor 35, armature 36*b* of a telephone cutout relay 36, and armature 216*a* of the supervisory control start relay 216 which operates in response to initiation of a supervisory control operation from the dispatching office.

At the substation, the telephone equipment 30 may be connected to the carrier frequency equipment 12 by means of conductor 38, and a circuit extending through conductor 39, the armature 40*a* of a telephone cutout relay 40, armature 313*a* of the supervisory relay 313 which operates whenever an operation is initiated at the substation, and conductor 41.

In order to disconnect the telephone equipment 30 at the substation from the carrier frequency equipment 12 when a supervisory control operation is initiated at the dispatching office, provision may be made for energizing the telephone cutout relay 40 in response to the receipt of the second coded carrier frequency impulse at the substation. For example, the energizing circuit for the telephone cutout relay 40 may be completed through armature 304*b* of the second relay in the counting chain at the substation. The telephone cutout relay 36 at the dispatching office may likewise be connected for energization through armature 139*b* of counting relay 139. At this point, it may be noted that the counting chains at both the substation and dispatching office have been modified from the original showing in the Boswau patent by removing point 1 from the counting relays 139 and 304, so as to leave the original connections at points 1 and 2 disconnected. Points 1 in the present application are instead each connected in conjunction with the fourth relay of the counting chain, namely, relays 141 and 306 at the dispatching office and substation, so that four coded impulses are required for selecting point 1, instead of the two, as in Boswau. Otherwise, the equipments are similar to that of the Boswau patent, and the relays function in substantially the same manner.

In order to condition the supervisory control equipment for performing a supervisory control operation when the communication equipment may have the carrier frequency transmitters and receivers operating, provision may be made for effectively disconnecting the line relay 200′ from the receiver 16 at the dispatching office. For example, the connection to the station battery for the line relay 200′ may be made through armature 216*b* so that the line relay is disconnected from the station battery when the start relay 216 operates. For the purpose of later conditioning the line relay for receiving a check code from the substation in response to selection of a point of the supervisory control, the line relay 200′ may be connected to the station battery through armature 212*a* of relay 212 which operates to stop the point selection code on operations initiated at the dispatching office. Further provision may be made for connecting the line relay 200′ to the station battery through armature 211*a* of relay 211 which operates to start the check code in response to an operation initiated at the remote substation, so as to prevent the operator from starting another supervisory control operation and removing the station battery from the line relay at armature 216b.

At the substation a control relay 45 of the delayed dropout type is provided for normally connecting the line relay 400' to the station battery through armature 45b when the receiver relay 24 operates. An auxiliary relay 47 may be provided for deenergizing the control relay 45 to remove the station battery from the line relay 400' in response to the initiation of a supervisory control operation from the substation. For example, the energizing circuit for the auxiliary relay 47 may be completed through armature 418b of the substation start control relay, which operates in response to the receipt of a supervisory control signal armature 313b of the supervisory relay 313 which operates to indicate an automatic operation at the substation, and armature 413d of relay 413 which operates to stop the selection code in response to an operation originating at the substation. A holding circuit for the auxiliary relay 47 is provided through its armature 47b, armature 412c, and armature 413d, so as to prevent interference with an operation initiated at the dispatching office in the event that the supervisory relay 313 might be deenergized during initiation of an operation from the dispatching office.

When a supervisory control operation is initiated from the dispatching office while the carrier frequency equipments are connected to the signal channel, such as during a telephone communication, the carrier receiver relays 22 and 24 are both energized, as are also the line relays 200' and 400'. Operation of the point selection key 114 at the dispatching office to initiate a supervisory control operation for sending four signal impulses for selecting the corresponding point at the substation results in energization of the supervisory start relay 216. The connection of the telephone equipment 26 to the carrier frequency equipment 10 is therefore interrupted at armature 216a. This deenergizes the telephone relay 28, which deenergizes the transmitter 14, and thus removes the carrier frequency F2 from the signal channel. This returns the receiver relay 24 to the deenergized position, and results in disconnection of the line relay 400' from the station battery at the substation at armature 24a. The connection of the line relay 200' at the dispatching office to the station battery is interrupted at armature 216b, so that it becomes deenergized although the receiver relay 22 remains energized. The slow release relay 202 is now energized and provides a connection for indirect positive through armature 223. This conditions the supervisory control relays at the dispatching office so as to enable the impulsing relay 201' to key the carrier transmitter 14 to transmit the usual point selection code signal of four pulses on frequency F2. The line relay 200' is energized in accordance with operation of the impulse relay 201' through armature 201'a.

When the first signal impulse is received at the substation, the start control relay 418 is energized. The energizing circuit for the auxiliary relay 47 is interrupted at armature 418b to prevent operation of any substation equipment from interfering with the operation from the dispatching office. Upon receipt of the second impulse of the code signal at the substation, counting relay 304 is energized, and an obvious energizing circuit is provided for the telephone cutout relay 40 through armature 304b. The cutout relay 40 operates, and interrupts the connection of the telephone equipment 30 to the carrier equipment 12 at armature 40a. The cutout relay 40 provides a holding circuit for itself through armature 40b. Disconnection of the telephone equipment 30 from the carrier frequency equipment 12 interrupts the energizing circuit of the telephone relay 32, which returns to the deenergized condition, deenergizing the transmitter 18. This removes carrier frequency F1 from the signal channel and releases the receiver relay 22 at the dispatching office.

At the end of the point selection code the dispatching office relay 212 is energized, and the station battery is connected to the armature 22a of the receiver relay 22, through armature 212a, so as to provide for operating the line relay 200' in response to the receipt of coded carrier frequency signals comprising the check code from the substation. At the substation relay 412 is energized to start sending the check code, and the holding circuit for the auxiliary relay 47 is interrupted at armature 412C to prevent interference with the sending of said code. The supervisory control equipment now has complete control of the carrier signal, and transmission of the control code and supervision code may proceed in the usual manner, with the impulse relays keying the transmitters, and the line relays being energized through the receiver relays. At the end of the supervision code, the supervisory control equipment resets and releases the carrier channel to the communication equipment, since relay 216 and the telephone cutout relay 40 are returned to the deenergized position when indirect positive is removed at both stations during reset.

When a supervisory control operation is initiated from the substation, while the carrier frequency channel is energized during communication, the supervisory relay 313, which is normally energized, becomes deenergized. An energizing circuit is therefore provided for the auxiliary relay 47, extending from negative through the operating winding of the relay 47, armature 418b of the substation start control relay, armature 313b, and armature 413d to direct positive. Energization of the auxiliary relay 47 removes the station battery from the slow-to-release control relay 45 at armature 47a. Operation of the relay 45 to the deenergized position after a predetermined time delay disconnects the carrier receiver relay armature 24a from the station battery at armature 45b, thus deenergizing the line relay 400'. The deenergization of the line relay 400' provides an obvious energizing circuit for the slow release relay 402, which then supplies indirect positive to the supervisory control equipment through armature 421. Operation of the supervisory relay 313 interrupted the connection of the telephone equipment 30 to the carrier frequency equipment 12 at armature 313a, thus releasing the telephone relay 32, and deenergizing the transmitter 18 at armature 32a. This results in deenergization of the receiver relay 22 at the dispatching office, since the carrier frequency F1 is now removed from the channel. The line relay 200' therefore is deenergized and provides an energizing circuit for the slow release relay 202.

Energization of the reset relay 402 conditions the supervisory control equipment at the substation for operation in the usual manner, whereby the impulse relay 401' keys the carrier transmitter 18 through armature 401'a to transmit the usual point selection code impulses on frequency F1. The line relay 400′ is energized in response to operation of the impulse relay 401′ through armature 401′b.

When the second impulse of frequency F1 is received at the dispatching office, an energizing circuit is provided for the telephone cutout relay 36 at armature 139b of the counting relay 139. Cutout relay 36 operates to interrupt the connection of the telephone equipment 26 to the carrier frequency equipment 10 at armature 36b. This deenergizes the telephone relay 28 and removes the carrier frequency F2 from the signal channel. A holding circuit for the cutout relay 36 is provided through armature 36a. At the end of the point selection code, substation relay 413 is energized, and provides for connecting the station battery to the line relay 400′ through armature 413d and its front contact, whenever the receiver relay 24 is energized in response to the receipt of the usual check code from the dispatching office. The holding circuit for the auxiliary relay 47 is interrupted at armature 413d and its back contact, so as to provide for reenergizing the control relay 45 to restore the battery connection to the line relay 400′ at armature 45b. At the dispatching office, relay 211 is energized at the end of the selection code, and it connects the station battery to the armature 22a of the receiver relay 22 at armature 211a to prevent the operator from interfering by making a point selection and energizing the start relay 216. The supervisory control equipment proceeds with the transmission of the check code, control code and supervision code in the usual manner. Upon termination of the supervision code, the equipment resets and the supervisory relay 313 is reenergized, while the telephone cutout relay 36 is deenergized upon the removal of indirect positive, so as to restore the connections of the telephone equipment to the carrier frequency equipment for communication purposes.

When a supervisory control operation is initiated from the dispatching office with the communication off, both the carrier receiver relays 22 and 24, and hence the line relays 200′ and 400′ will be in the deenergized condition. The reset relays 202 and 402 will both be energized so that indirect positive is immediately available for effecting operation of the supervisory control equipment to key the transmitters, and operate in response to energization of the receiving relays, in substantially the same manner as described in connection with the initiation of an operation from a dispatching office with the carrier frequency equipment operating. When a supervisory control operation is initiated from a substation with the carrier off, indirect positive is immediately available at both locations. The auxiliary relay 47 is energized through the circuit hereinbefore described in connection with the supervisory relay 313, thus resulting in the control relay 45 being deenergized after a predetermined time delay. This provides an energizing circuit for the substation start relay 417 through armature 45a and supervisory control operations may now be performed in the usual manner.

From the above description and the accompanying drawings, it will be apparent that I have provided in a simple and effective manner for performing supervisory control operations over a two-frequency communication channel. Preference is given to the supervisory control equipment under all conditions without requiring the use of modulating equipment for effecting operation of the supervisory control equipment. A system embodying the features of my invention requires a minimum of equipment and provides a reliable and inexpensive remote control system.

Since certain changes may be made in the above-described construction, and different embodiments of the invention may be made without departing from the spirit and scope thereof, it is intended that all the matter contained in the above description and shown in the accompanying drawings shall be considered as illustrative and not in a limiting sense.

I claim as my invention:

1. The combination with a two-frequency communication system having telephone apparatus at each of two stations connected to transmit communications through a transmitter at one station and a receiver at the other station operating on one carrier frequency, and a transmitter at the other station and a receiver at said one station operating on a different carrier frequency, of supervisory control equipment at each of said stations having at least one control point and including sending and receiving relays operable to select a point at one station from a corresponding point at the other in response to coded signals, circuit means connecting the sending and receiving relays at each station to operate the transmitter and operate from the receiver, respectively, circuit means including a relay connected to be responsive to initiation of a supervisory control operation from one station to effect disconnection of the telephone apparatus from the transmitter at said one station, and circuit means including a relay at the other station connected to be operable in response to operation of the supervisory control equipment at said other station from said one station to effect disconnection of the telephone apparatus from the transmitter at said other station.

2. In combination with communication apparatus at remote stations, a carrier frequency transmitter and a carrier frequency receiver at one station connected to transmit communications from said apparatus on one frequency and receive them for said apparatus on a different frequency, a carrier frequency transmitter and a carrier frequency receiver at another station connected to transmit communications from said apparatus at said another station on said different frequency and receive them for said apparatus on said one frequency, supervisory control equipment at each station including a line relay disposed to effect operation of the equipment, a circuit connecting the line relay to be energized in response to carrier frequency signals received at said stations and an impulsing relay, a circuit connecting the impulsing relay to key the transmitter to transmit coded carrier frequency signals, a circuit connected to provide an energizing circuit for the line relay at each station in response to operation of the impulsing relay at said station, and means including a relay at each station connected to interrupt the connection of the communication apparatus to the carrier frequency transmitter at said station in response to receipt of a supervisory control signal from the other station.

3. In a two-frequency system having two stations with a transmitter at one station and a receiver at another operating on one carrier frequency and a transmitter at said another station and a receiver at said one station operating on a different carrier frequency, said stations each having telephone receiving and transmitting equipment connected in operating relation with the carrier receiver and transmitter at the respective station, supervisory control equipment at each station having a plurality of points and supervisory control sending and receiving relays for sending and receiving coded signals for selectively controlling said points, circuit means at each station connecting the supervisory control sending relay to key the transmitter at said station to produce coded carrier frequency signals, additional circuit means for connecting the supervisory control receiving relay at each station to respond to coded carrier frequency signals received by the respective receiver, control means including a relay responsive to operation of the supervisory control equipment at one station to send coded carrier frequency signals for selecting a point at said other station to effect disconnection of the telephone receiving and transmitting equipment from the carrier receiver and transmitter, said control means being operable also to effect interruption of the additional circuit means at said one station, and circuit means including a relay at the other station operable in response to receipt of said coded carrier frequency signals by the receiver at said other station connected to effect disconnection of the telephone receiving and transmitting equipment from the carrier receiver and transmitter at said other station.

4. The combination with a communication system having telephone equipment at each of two stations connected to operate through a transmitter at one station and a receiver at the other operating on one carrier frequency, and a transmitter at the other station and a receiver at said one station operating on a different frequency, of supervisory control equipment at each of the stations having a plurality of control points and supervisory sending and receiving relays connected to send and receive coded signals for selectively controlling said points, circuit means including a relay operable to connect the supervisory sending relay at each station to key the transmitter thereat for producing coded carrier frequency signals, additional circuit means at each station normally disposed to connect the supervisory receiving relay at said station for operation in response to receipt of a carrier frequency signal by the carrier receiver thereat, control means connected to operate in response to initiation of a supervisory control operation from one station to effectively disconnect the supervisory receiving relay at said one station from the carrier receiver at said station and effect disconnection of the telephone equipment from the carrier frequency transmitter and receiver, at said station, control means at the other station, a circuit connecting the control in response to receipt of coded carrier frequency signals during selection of a point at said other station to effect disconnection of the telephone equipment from the carrier frequency transmitter and receiver at said other station, and circuit means including contacts of the supervisory equipment operable upon completion of the transmittal of coded carrier frequency signals from said one station to effect reconnection of the supervisory receiving relay at said one station to the carrier receiver at said one station for receiving coded carrier frequency signals from said other station.

5. The combination with telephone equipment at each of two remotely disposed stations, of carrier frequency equipment at each station including a carrier transmitter at one station cooperative with a carrier receiver at the other station operating on one frequency and a carrier transmitter at said other station cooperative with a carrier frequency receiver at said one station operating on a different frequency, circuit means at each station connecting the telephone equipment for operating through the carrier receiver and transmitter at said station, supervisory control equipment at each station having a plurality of control points and having supervisory sending and receiving relays for sending and receiving coded signals for selectively controlling points at one station from corresponding points at the other station, circuit means at each of the stations connecting the supervisory sending relay to key the carrier transmitter at said station for producing coded carrier frequency signals and connecting the supervisory receiving relay for energization in response to operation of the carrier receiver at said station, a circuit including contact means at each station operable in response to initiation of a supervisory control operation from one of the stations connected to disconnect the telephone equipment at said station from the carrier frequency transmitter and receiver at said station whereby said transmitter is rendered inoperative, an additional circuit including contact means connected to render the supervisory receiving means at said one station inoperative, control means at the other station, and a circuit connecting the control means to operate through the supervisory control equipment in response to coded carrier frequency signals from said one station to disconnect the telephone equipment from the carrier frequency equipment at said other station, whereby the transmitter of said equipment is rendered inoperative and may be keyed by the supervisory sending means.

6. The combination with telephone equipment at each of two remotely disposed stations of carrier frequency equipment at each station including a transmitter at one station cooperative with a receiver at the other operable on one carrier frequency and a transmitter at the other station cooperative with a receiver at said one station operable on a different carrier frequency, of circuit means at each station connected to key the carrier transmitter in response to operation of the telephone equipment at said station, supervisory control means at each station having a plurality of control points and supervisory receiving and sending relays connected to receive and transmit coded signals to selectively control said points, a circuit connecting the supervisory sending relay at each station to key the transmitter at the same station for transmitting coded carrier frequency signals, a circuit connecting the supervisory receiving relay at each station to a source of electrical energy in response to receipt of carrier frequency signals by the carrier receiver at the same station, circuit means including a relay responsive to the initiation of a supervisory control operation at one station connected to disconnect the supervisory receiving relay at said station from said source and effect disconnection of the telephone equipment at said station from the carrier frequency equipment, and control means at the other station including a relay connected to operate in response to the reception of coded carrier frequency signals from said one station to disconnect the telephone equipment from the carrier frequency equipment at said other station.

7. In a two-frequency communication system having telephone equipment at each of two stations disposed to be connected to carrier frequency equipment including a transmitter at one station and a receiver at the other operating on one carrier frequency and a transmitter at the other station and a receiver at said one station operating on a different carrier frequency, supervisory control equipment at each station having a plurality of control points and supervisory sending and receiving relays connected to transmit and receive coded signals for selectively controlling said points, circuit means at each station connecting the supervisory sending relay to key the transmitter at said station to produce coded carrier signals, circuit relay connecting the supervisory receiving means to a source of electrical energy in response to operation of the carrier receiver, means including a relay connected to be responsive to initiation of a supervisory control operation from one station to disconnect the telephone equipment from the carrier equipment and disconnect the supervisory receiving relay from the source of electrical energy, means at the other station including a relay connected to be operable in response to selection of a point of the supervisory control equipment to disconnect the telephone equipment at said other station from the carrier frequency equipment and interrupt the telephone keying circuit of the carrier transmitter, circuit means at said other station operable after selection of the points at said other station to provide a keying circuit for the supervisory sending relay to key the transmitter for transmitting a supervisory check code.

WILLARD A. DERR.

References Cited in the file of this patent

UNITED STATES PATENTS

| Number | Name | Date |
|---|---|---|
| 2,091,301 | Boswau | Aug. 31, 1937 |